2,906,740
VULCANIZABLE ELASTOMER PELLET AND PROCESS OF FORMING UNSCORCHED EXTRUDATE

John Becker and Charles E. McCormack, Wilmington, Del., assignors to E. I. du Pont de Nemours and Company, Wilmington, Del., a corporation of Delaware No Drawing. Application June 8, 1956
Serial No. 590,109

7 Claims. (Cl. 260—79.5)

This invention relates to the curing of elastomers and more particularly to a process for preparing and extruding elastomer stocks without scorching.

The amount and kind of vulcanization accelerator used in any elastomer compound is limited by the treatment the stock must receive before the actual vulcanization step. Thus it is well known that the milling, sheeting, and particularly, extruding operations, which are required to incorporate the ingredients and to shape the stock, cause scorching unless the accelerator system is carefully selected. This usually means that the acceleration in a stock to be extruded must be rather weak, requiring long curing times or high curing temperatures or both and adding to the cost of the operation. Such limitations may even make practical solutions of certain problems seem impossible. Thus, for example, when it is desired to coat wire with certain thermoplastic materials and then with a mechanically resistant jacket of an elastomer such as polychloroprene, it has been found that the curing time required for a jacket stock that may be extruded without scorching is much too long for practical operation at the rather low temperature which must be used to prevent deformation of the thermoplastic material when the jacket is extruded over it and cured.

It is an object of the present invention to prepare, for extrusion, elastomer stock in the form of pellets coated with an active vulcanization non-scorching accelerator and to the process of extruding said elastomer stocks in the form of elastomer accelerator coated pellets without scorching.

More specifically, the present invention is directed to the preparation of compounded elastomer base stock in the form of pellets, said pellets being of a dimension not greater than about ½ inch and said pellets having applied to the surface thereof an active vulcanization non-scorching accelerator; the present invention is also directed to a process for forming non-scorched extruded articles which process comprises extruding a vulcanizable elastomer stock in the form of the heretofore defined pellets by passing said pellets through an extruding device whereby a homogeneous, unscorched, but readily vulcanized extrudate is formed.

The pellets used in this invention may be of any shape and of any size provided that the largest dimension is not greater than about ½ inch. Preferably, however, the pellets should approach somewhat to a spherical or cubical shape, so that they may flow freely.

A convenient way for making pellets to be coated according to the present invention is to extrude a continuous length of the compounded stock and cut it into short lengths, using equipment on the market for this purpose, or to cut a sheet of the compounded elastomer into strips with existing equipment and then cut these into suitable lengths. Alternatively, the pellets may be formed directly from a compounded latex of the elastomer, for example, by passing the latter into a coagulating bath to form continuous bands or threads which are then cut up, or by forming crumbs by coagulation in cases where this is possible, as the usual dispersions of butadiene-styrene copolymers, or by introducing the latex in the form of droplets into a refrigerated bath, followed by thawing of the coagulated droplets, and drying.

This invention applies to all vulcanizable elastomers, examples of which are, natural rubber, polychloroprene, butadiene-styrene copolymers, an isobutylene-isoprene copolymer, an isobutylene-butadiene copolymer, and a butadiene-acrylonitrile copolymer as well as chlorosulfonated polyethylene.

The vulcanization non-scorching accelerators of the present invention are preferably, but not necessarily, highly active toward the particular elastomer used. Thus for polychloroprene, typical active accelerators are diethyl thiourea, 2-mercaptoamidazoline and a liquid butyraldehyde-aniline condensation product. When the accelerator is a solid, it is applied to the surface of the elastomer pellets as a powder. When it is a liquid, it may be applied to the surface as such and then coated with an inert powder such as talc to prevent the pellets from adhering to each other. The coatings are conveniently applied by tumbling.

When the coated elastomer pellets of the present invention are stored at room temperature, said elastomer does not show signs of becoming vulcanized at a rapid rate even though the active accelerator is in contact with the vulcanizable stock.

The proportion of accelerator used will depend on its activity and the amount of acceleration desired. At least 10% may be readily applied as a surface coating but this is usually more than required. Part of the other compounding ingredients to be used may also be applied, if desired, to the surface of the pellets.

EXAMPLES

The following unaccelerated polychloroprene base stock was prepared on a rubber mill in the usual manner:

| | |
|---|---|
| Polychloroprene | 100 |
| Phenyl beta-naphthylamine | 2 |
| Magnesium oxide | 4 |
| Semi-reinforcing furnace black | 25 |
| Fast extruding furnace carbon black (medium abrasion furnace black) | 25 |
| Hard clay | 35 |
| Paraffin wax | 3 |
| Light hydrocarbon oil | 12 |
| Zinc oxide | 5 |

This stock was then extruded in the form of rods of ⅛, ¼ and ½ inch diameter, using an extruder with a barrel 2 inches in diameter and 21 inches long and a screw of 1⅛ inches root diameter with a double flight of blades of decreasing angle of pitch, giving a compression ratio of 1.74. The screw speed was 50 r.p.m. and the barrel was at 140° F., the head at 160–180° and the die at 200°. The rods were extruded continuously into a large rotating pan, dusted lightly with talc, and cut into lengths equal to the rod diameter.

Example 1

The ⅛ inch pellets made above were tumbled with four parts of a liquid butyraldehyde-aniline condensation product (per 100 parts of polychloroprene present) until this rather viscous liquid was uniformly distributed over the surface and were then coated with 8 parts of talc. The same extruder was used as above with a one-inch tubing die and a breaker plate with ⅛ inch holes, and a 60-mesh screening backed up by a 14-mesh screen. The screw (worm) speed was 60 r.p.m. but the temperatures were as before, with the extruded stock reaching 200–225° F. and being quenched to room temperature. There was no evidence of scorching of the stock thus extruded, The stock could be recirculated through the extruder for six minutes before setting up. The coated pellets could be stored for 24 hours at either room temperature or 113° F. without scorching when extruded and after 48 hours under these conditions showed only "trace" and "noticeable" scorching, respectively.

This extruded accelerated stock was cured in a form suitable for routine physical testing by splitting the tube formed and curing the resulting sheet in a press.

The following results were obtained:

| Temperature | 227° F. (open steam) | | | | 113° F. (heated room) | |
|---|---|---|---|---|---|---|
| Time | 5 min. | 10 min. | 15 min. | 40 min. | 48 hrs. | 72 hrs. |
| Tensile strength, p.s.i. | 1,375 | 1,600 | 1,600 | 1,700 | 1,200 | 1,790 |
| Elongation, percent | 620 | 560 | 480 | 340 | 740 | 740 |
| Modulus at 200% elongation | 525 | 625 | 675 | 950 | 500 | 550 |
| Permanent set (D-470 method) | 0.47 | 0.39 | 0.32 | 0.27 | | |

These curing conditions, while giving good cures, are mild enough not to damage a plastic insulation on a wire over which the polychloroprene stock may be applied.

Satisfactory cures were obtained under the same conditions when using only 2 parts of butyraldehyde-aniline condensation product. Both vulcanizates showed good aging in the air oven and oxygen bomb.

*Example 2*

The ½ and ¼ inch pellets made above were coated by tumbling with six parts (per 100 parts of polychloroprene present) of 1,3-diethyl thiourea and formed by extrusion into a continuous tube. The resistance to scorching, ease of curing, and physical properties of the vulcanizates were similar to those obtained in Example 1.

Although the invention has so far been illustrated with reference to polychloroprene as the elastomer, similar advantages are obtained when the elastomer is chlorosulfonated polyethylene, natural rubber, a butadiene-styrene copolymer, an isobutylene-butadiene copolymer, an isobutylene-isoprene copolymer and a butadiene-acrylonitrile copolymer, using for each elastomer the accelerators required for their rapid curing, particularly those which would cause scorching if introduced in the conventional way on a mill or internal mixer.

It is apparent that many different embodiments of this invention may be made without departing from the spirit and scope thereof, and therefore, it is not intended to be limited except as indicated in the appended claims.

We claim:

1. A vulcanizable non-scorching elastomer pellet of a dimension not greater than one-half inch, said elastomer being taken from the group consisting of natural rubber, polychloroprene, a copolymer of butadiene and styrene, a copolymer of isobutylene and isoprene, a copolymer of isobutylene and butadiene, a copolymer of butadiene and acrylonitrile, and, chlorosulfonated polyethylene, the entire pellet surface of which is coated with an active vulcanization accelerator taken from the group consisting of diethyl thiourea, 2-mercaptoamidazoline, and, a liquid butyraldehyde-aniline condensation product, none of said accelerator being contained within said pellet.

2. A vulcanizable non-scorching polychloroprene pellet of a dimension not greater than one-half inch, the entire pellet surface of which is coated with an active vulcanization accelerator taken from the group consisting of diethyl thiourea, 2-mercaptoamidazoline, and, a liquid butyraldehyde-aniline condensation product, none of said accelerator being contained within said pellet.

3. A vulcanizable non-scorching isobutylene-butadiene copolymer pellet of a dimension not greater than one-half inch, the entire pellet surface of which is coated with an active vulcanization accelerator taken from the group consisting of diethyl thiourea, 2-mercaptoamidazoline, and, a liquid butyraldehyde-aniline condensation product, none of said accelerator being contained within said pellet.

4. A vulcanizable non-scorching butadiene-styrene copolymer pellet of a dimension not greater than one-half inch, the entire pellet surface of which is coated with an active vulcanization accelerator taken from the group consisting of diethyl thiourea, 2-mercaptoamidazoline, and, a liquid butyraldehyde-aniline condensation product, none of said accelerator being contained within said pellet.

5. A vulcanizable non-scorching natural rubber pellet of a dimension not greater than one-half inch, the entire pellet surface of which is coated with an active vulcanization accelerator taken from the group consisting of diethyl thiourea, 2-mercaptoamidazoline, and, a liquid butyraldehyde-aniline condensation product, none of said accelerator being contained within said pellet.

6. The process of forming an unscorched vulcanizable extrudate which comprises forming a vulcanizable elastomer stock in the form of pellets of a dimension not greater than one-half inch, said elastomer being taken from the group consisting of natural rubber, polychloroprene, a copolymer of butadiene and styrene, a copolymer of isobutylene and isoprene, a copolymer of isobutylene and butadiene, a copolymer of butadiene and acrylonitrile, and, chlorosulfonated polyethylene, and applying to the entire surface of said pellets an active vulcanization accelerator taken from the group consisting of diethyl thiourea, 2-cercaptoamidazoline, and, a liquid butyraldehyde-aniline condensation product, none of said accelerator being contained within said pellets, followed by extruding said pellets.

7. The process of claim 6 wherein the elastomer is polychloroprene.

References Cited in the file of this patent

UNITED STATES PATENTS

| 2,576,444 | Clinefelter | Nov. 27, 1951 |
| 2,640,088 | Glenn et al. | May 26, 1953 |

UNITED STATES PATENT OFFICE

CERTIFICATE OF CORRECTION

Patent No. 2,906,740 September 29, 1959

John Becker et al.

It is hereby certified that error appears in the printed specification of the above numbered patent requiring correction and that the said Letters Patent should read as corrected below.

Column 2, line 15, for "2-mercaptoamidazoline" read -- 2-mercaptoimidazoline --; column 4, lines 4, 11, 18, 26 and 34, for "2-mercaptoamidazoline", each occurrence, read -- 2-mercaptoimidazoline --; line 48, for "2-cercaptoamidazoline" read -- 2-mercaptoimidazoline --.

Signed and sealed this 19th day of April 1960.

(SEAL)
Attest:

KARL H. AXLINE
Attesting Officer

ROBERT C. WATSON
Commissioner of Patents